United States Patent
Saha (10) Patent No.: US 12,101,625 B2
(45) Date of Patent: Sep. 24, 2024

(54) SELECTIVE HANDOVER OF CELLULAR DEVICE BASED ON NETWORK SLICING

(71) Applicant: DISH Wireless L.L.C., Englewood, CO (US)

(72) Inventor: Sougata Saha, Aurora, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 313 days.

(21) Appl. No.: 17/497,467

(22) Filed: Oct. 8, 2021

(65) Prior Publication Data
US 2023/0115367 A1   Apr. 13, 2023

(51) Int. Cl.
*H04W 36/08*   (2009.01)
*H04W 36/00*   (2009.01)
*H04W 36/22*   (2009.01)
*H04W 36/24*   (2009.01)
*H04W 36/30*   (2009.01)

(52) U.S. Cl.
CPC ....... *H04W 36/0061* (2013.01); *H04W 36/13* (2023.05); *H04W 36/22* (2013.01); *H04W 36/008357* (2023.05); *H04W 36/24* (2013.01); *H04W 36/302* (2023.05)

(58) Field of Classification Search
None
See application file for complete search history.

(56) References Cited

U.S. PATENT DOCUMENTS

| | | | | |
|---|---|---|---|---|
| 10,945,194 B2 * | 3/2021 | Lou | ..................... | H04L 41/0895 |
| 11,722,939 B2 * | 8/2023 | Ma | ................... | H04W 36/0088 370/331 |
| 2018/0124661 A1 | 5/2018 | Tsai | | |
| 2018/0192445 A1 * | 7/2018 | Jiang | ..................... | H04W 72/21 |
| 2019/0191348 A1 * | 6/2019 | Futaki | ............... | H04W 36/0033 |
| 2019/0274072 A1 * | 9/2019 | Prasad | ............. | H04W 12/0431 |
| 2019/0289528 A1 * | 9/2019 | Lou | ........................ | H04W 48/10 |
| 2019/0289534 A1 * | 9/2019 | Ryoo | .................... | H04W 76/28 |
| 2020/0059987 A1 * | 2/2020 | Hong | .................... | H04W 36/08 |
| 2020/0314701 A1 * | 10/2020 | Talebi Fard | .......... | H04W 36/08 |
| 2021/0037455 A1 * | 2/2021 | Zhu | ........................ | H04W 60/00 |
| 2021/0258865 A1 * | 8/2021 | Park | ..................... | H04B 17/318 |

(Continued)

FOREIGN PATENT DOCUMENTS

| | | |
|---|---|---|
| CN | 110419240 A | 11/2019 |
| CN | 110708734 A | 1/2020 |

(Continued)

OTHER PUBLICATIONS

International Search Report and Written Opinion for PCT/US2022/045929, mailed Jan. 25, 2023, 20 pages.

*Primary Examiner* — Kodzovi Acolatse
(74) *Attorney, Agent, or Firm* — Seed IP Law Group LLP (57) ABSTRACT

Systems and methods to utilize user device network slicing and cell support to manage handover of communications for user device. A request to handover management of a user device from a first cell to a second cell is received. One or more possible cells for the handover are then identified. If the user device is utilizing network slicing, then the second cell is selected from the one or more possible cells based on that cell also supporting network slicing. If the cell supports the same network slice as being utilized by the user device, then the handover of the user device to the second cell is initiated.

12 Claims, 4 Drawing Sheets

(56) References Cited

U.S. PATENT DOCUMENTS

| | | | | |
|---|---|---|---|---|
| 2021/0267007 A1* | 8/2021 | Hong | .............. | H04W 36/0072 |
| 2022/0124587 A1* | 4/2022 | Awada | ................ | H04W 36/22 |
| 2022/0159615 A1* | 5/2022 | Ryu | .................... | H04W 68/005 |
| 2022/0217625 A1* | 7/2022 | Zhu | ...................... | H04W 36/14 |
| 2022/0256417 A1* | 8/2022 | Ianev | .................. | H04W 36/08 |
| 2022/0287036 A1* | 9/2022 | Mildh | ................. | H04W 72/56 |
| 2023/0056855 A1* | 2/2023 | Jiang | ................... | H04W 36/30 |
| 2023/0062362 A1* | 3/2023 | Sun | ..................... | H04W 72/20 |
| 2023/0115367 A1* | 4/2023 | Saha | ................... | H04W 36/08 370/331 |
| 2023/0156583 A1* | 5/2023 | Murray | .............. | H04W 48/20 370/329 |
| 2023/0189111 A1* | 6/2023 | Bulakci | .............. | H04W 48/18 370/331 |
| 2023/0232302 A1* | 7/2023 | Li | ........................ | H04W 36/30 455/436 |
| 2023/0247685 A1* | 8/2023 | Choe | .................. | H04W 76/10 370/329 |
| 2023/0247716 A1* | 8/2023 | Hong | ............... | H04W 28/0226 370/254 |
| 2023/0328636 A1* | 10/2023 | Fu | ....................... | H04W 48/18 |
| 2024/0064587 A1* | 2/2024 | Sun | ..................... | H04W 36/08 |

FOREIGN PATENT DOCUMENTS

| | | | | |
|---|---|---|---|---|
| CN | 113810961 A | 12/2021 | | |
| CN | 114885394 A | 8/2022 | | |
| WO | WO-2021088625 A1 * | 5/2021 | ............ | H04W 24/08 |

* cited by examiner

SELECTIVE HANDOVER OF CELLULAR DEVICE BASED ON NETWORK SLICING

TECHNICAL FIELD

The present disclosure relates generally to digital message communications and, more particularly, to utilizing network slicing to handover management of a user device in a cellular network to a next cell.

BACKGROUND

Description of the Related Art

Smart phones are being used more and more by more and more people. As the use of smart phones has increased, so too has the desire for more reliable, fast, and continuous transmission of content. In an effort to improve the content transmission, networks continue to improve with faster speeds and increased bandwidth. The increase in the number of smart phones, however, has also resulted in increased cellular traffic. As people move around, cell nodes need to handover service of smart phones to other cell nodes, such as when a smart phone is too far from a current cell or when the current cell is experiencing too much traffic. Many cell nodes and towers utilize load balancing to determine which cell is to handle traffic for which user device. Such load balancers often rely on latency and throughput as factors when determining which cell is to handle communications for which user device. Unfortunately, these factors do not provide an accurate representation of the actual needs of a user device when performing a handover from one cell to another. It is with respect to these and other considerations that the embodiments described herein have been made.

BRIEF SUMMARY

Briefly described, embodiments are directed toward systems and methods of performing cellular network handovers from one cell to another based on the network slice being utilized by the user devices and the network slices supported by the cells. A cell handover server, or the cells themselves, receive a request to handover management of a user device from a first cell to a second cell. One or more possible cells for the handover are then identified. If the user device is utilizing network slicing, then the cell handover server determines if one of the possible cells also supports the same network slicing being utilized by the user device. In response to determining that the user device is utilizing network slicing, the second cell is selected from the one or more possible cells that is also utilizing network slicing. Handover of the user device from the first cell to the second cell is then initiated. In this way, cellular networks can more efficiently maintain network slicing as the handling of user device communications is handed over from one cell to the next, which improves network efficiency and reduces resource utilization by the cells and the user device.

In various embodiments, a list of at least one cell from the one or more possible cells that utilizes network slicing is generated, and the second cell is selected from the list based on a network traffic load, network quality of service, or other network characteristics of the second cell relative to the network traffic load of other cells in the list. Moreover, the second cell is selected such that it supports the same network slice being used by the user device. If a cell does not support the same network slice, or if the slice is no longer available, or if network constraints prohibit a cell from handling a user device, the user device may be presented with a user interface that enables the user to select a next best cell for the handover.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
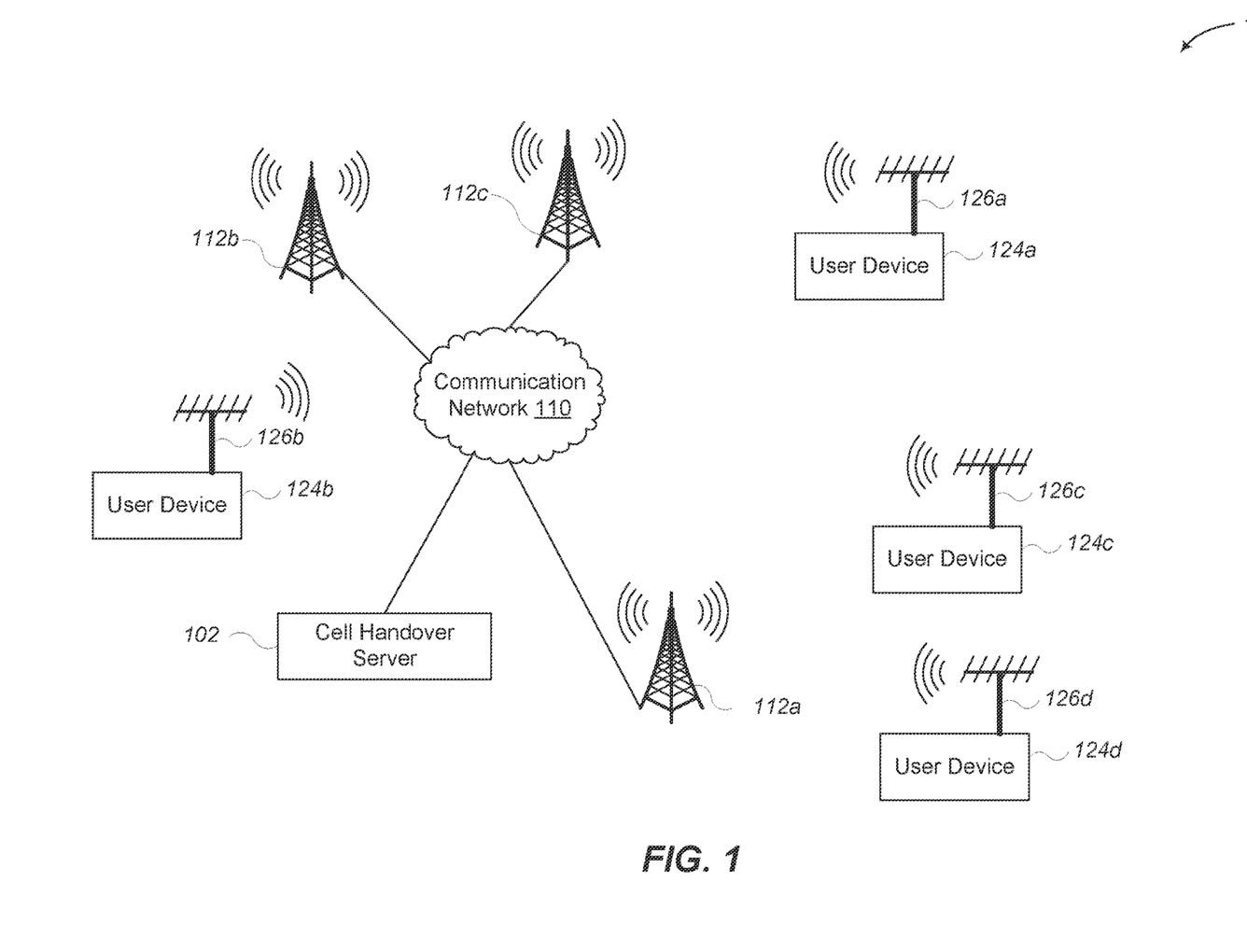
FIG. 1 illustrates a context diagram of an environment for utilizing network slicing to perform handover operations of a user device in accordance with embodiments described herein.

FIG. 1 illustrates a context diagram of an environment for utilizing network slicing to perform handover operations of a user device in accordance with embodiments described herein. Environment 100 includes a plurality of cells 112a-112c (collectively or individually referred to as cell 112), a plurality of user devices 124a-124d (collectively or individually referred to as cell 124), a cell handover server 102, and a communication network 110. Communication network 110 includes one or more wired or wireless networks, which may include a series of smaller or private connected networks that carry information among the cells 112a-112c and the cell handover server 102.

The cells 112a-112c are cellular towers that together implement a cellular communications network. The cells 112a-112c may include or be in communication with base stations, radio back haul equipment, antennas, or other devices, which are not illustrated for ease of discussion. In various embodiments, the cells 112a-112c may communicate with each other via communication network 110. In various embodiments, one or more of the cells 112a-112c may support one or more of a plurality of network slices for the overall network. Some cells, however, may not support some or any of the network slices.

Each cell 112 provides cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. The overall capacity of the network created by the cells 112a-112c depends on the coverage of each cell 112 and the interference that the cells 112 may have on each other. Because of interference, communication loads, latency, environmental effects, and other factors, the quality of communications between the user devices 124a-124d and the cells 112a-112c can vary from cell to cell and from time to time. Moreover, these network conditions can also change as the user devices 124a-124d move or change geographical locations relative to the cells 112a-112c.

The user devices 124a-124d are computing devices that receive and transmit cellular communication messages with the cells 112a-112c via antennas 126a-126d, respectively. Examples of user devices 124a-124d may include, but are not limited to, mobile devices, smartphones, tablets, cellular-enabled laptop computers, or other computing devices that can communication with a cellular network. The user devices 124a-124d periodically or when they determine that they are in need of a handover from one cell to another cell provide measurement reports, such as to include reference signal received power of the cell it is currently communicating with, to the cell handover server 102 via the cell 112 that is handling its communications. If the user device 124 is utilizing network slicing, then the user device can include a token, particular Internet Element, or other indicator in the measurement report to tell the cell handover server 102 that it is utilizing a particular network slice.

The cell handover server 102 collects various information, including network slicing information, from the cells 112a-112c, as well as from the user devices 124a-124d, to determine which cells are to handle or manage the network communications of the individual user devices 124a-124d. The cell handover server 102 may include one or more server devices, cloud computing resources, or other computing devices that perform embodiments described herein.

The following is one example of how the cell handover server 102 processes a request to handover the handling of communications for a user device from one cell to another cell. In this example, assume the network supports four different network slices designated as network slices 01, 02, 03, and 04. Also, assume that communications for user device 124c are being handled by cell 112a and that user device 124c is currently utilizing network slice 02 with cell 112a.

The user device 124c can periodically, or when a handover is needed, provide a measurement report to cell 112a, which can be provided to the cell handover server 102 to notify the cell handover server 102 of the network slice that user device 124c is using. One example of this measurement report may be {PCI 78 RSRP −70 NS: 02}. The PCI 78 and the RSRP −70 indicate the physical cell identifier for cell 112a and the current reference signal received power to that cell. The "02" indicates that the user device 124c is using network slice 02.

Assuming that user device 124c is moving out of the range of cell 112a and into the range of cells 112b and 112c. Cell 112a can send a handover request to cell handover server 102, which includes the network slicing information that was received from the user device 124c in the measurement report. In various embodiments, the user device 124c may have already provided the measurement report to the cell 112c and cell handover server 102. In other embodiments, the user device 124c may initiate the handover request and include the measurement report and the network slice information.

The cell handover server 102 can utilize network slicing information from the user device 124c and from cells 112b and 112c, along with other information, to determine which cell is best to handle communications for the user device 124c. In various embodiments, the cell handover server 102 determines which cell supports the same network slice currently being utilized by the user device 124c. In this example, cell 112b may support network slices 01, 02, and 03, and cell 112c may support network slices 01 and 04. If the cell handover server 102 determines that cell 112b supports the same network slice as user device 124c (e.g., network slice 02), but cell 112c does not, then the cell handover server 102 can select cell 112b for the handover.

Once the cell handover server 102 selects cell 112b for the handover, the cell handover server 102 informs the cells 112a and 112b to perform a handover of communications for user device 124c from cell 112a to cell 112b. Accordingly, the cell handover server 102 is attempting to handover the user device from one cell to another without disrupting the user device's utilization of network slicing.

If both cells 112b and 112c support the same network slice as being utilized by the user device 124c, or neither cell supports the same network slice as being utilized by the user device 124c, then the cell handover server 102 can select a cell for the handover based on other networking characteristics or constraints, such as load on the cells, latency, interference, etc.

In various embodiments, the cell handover server 102 may share the network sling information of cells 112a-112c with the cells that neighbors or are in the vicinity of one another. In at least one embodiment, a cell may be in the vicinity of another cell if the cells can perform a handover of user device communications between the cells. Accordingly, a cell 112 may store the network slicing capabilities for neighboring cells or for other cells that it can handover user device communication. For example, if cell 112a can handover communications for a user device to cell 112c, but not cell 112b (e.g., because cell 112b is too far away to handle communications for the user device), then cell 112a may store the network slicing capabilities for cell 112c and cell 112c may store the network slicing capabilities for cell 112a. In this example, cell 112c may also store the network slicing capabilities of cell 112b if those two cells can handover communications of user devices. By having cells 112 store network slicing capabilities of other neighboring cells 112, the cells 112 can utilize that information when determining which cell is to handle communications for a target user device when a communication handover is needed, such as when the cells determine an appropriate cell for a handover.

In some embodiments, each cell 112 may perform embodiments of the cell handover server 102 to determine an appropriate cell for a handover of a user device. Accordingly, embodiments described herein may be performed by the cell handover server 102, the cells 112a-112c, or a combination thereof.

The operation of certain aspects will now be described with respect to FIGS. 2 and 3. In at least one of various embodiments, processes 200 and 300 described in conjunction with FIGS. 2 and 3, respectively, may be implemented by or executed via circuitry or on one or more computing devices, such as cell handover server 102 or cell 112 in FIG. 1.

Figure 2:
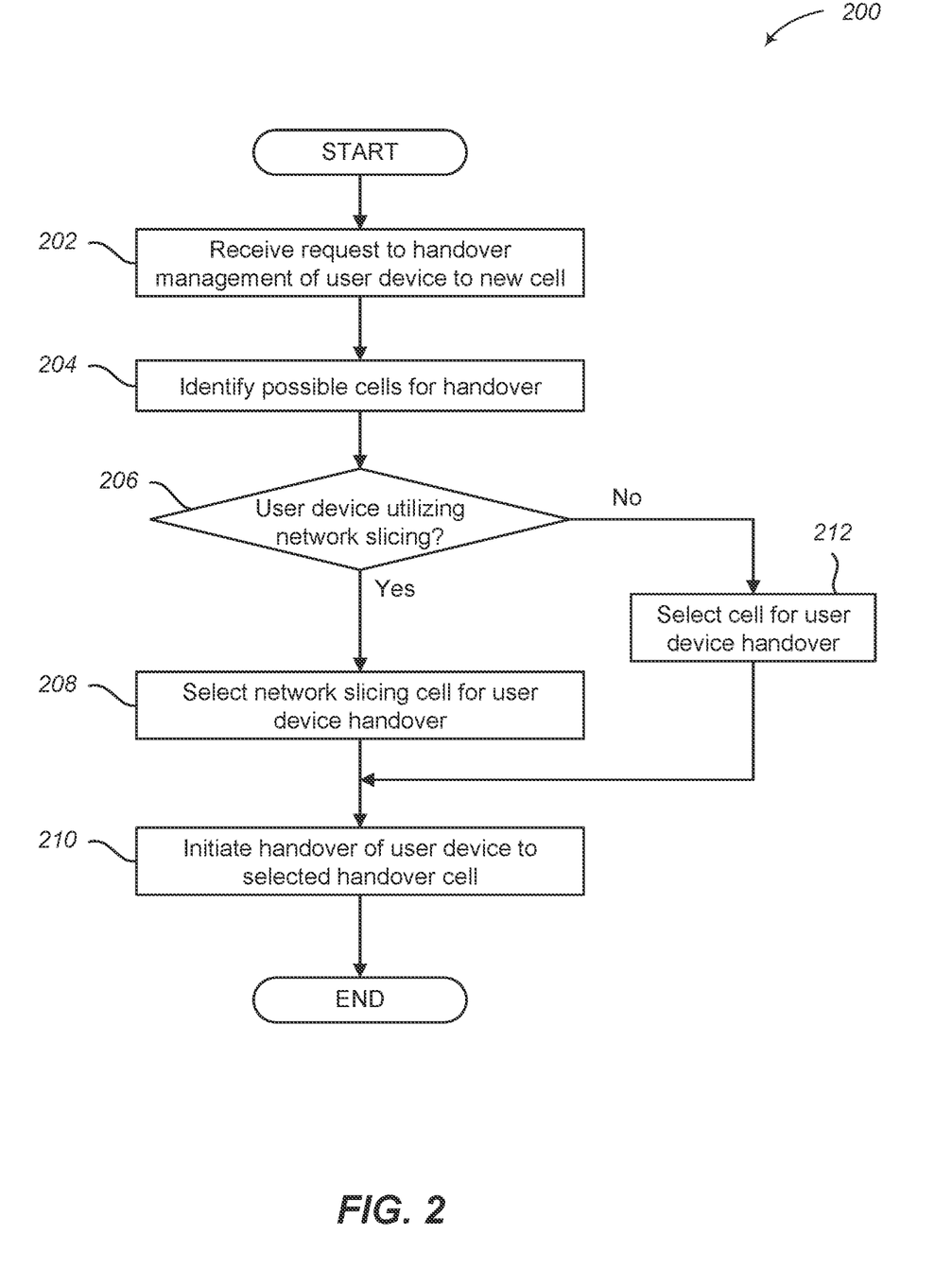
FIG. 2 illustrates a logical flow diagram showing one embodiment of a process for managing handover operations of a user device based on network slice supported cells in accordance with embodiments described herein.

FIG. 2 illustrates a logical flow diagram showing one embodiment of a process 200 for managing handover operations of a user device based on network slice supported cells in accordance with embodiments described herein.

Process 200 begins, after a start block, at block 202, where a request is received to handover management of a user device from a first cell to a new cell. In various embodiments, the request includes networking characteristics associated with the user device. For example, the request may identify which cells the user device can send or receive wireless transmissions. Likewise, the request may indicate one or more communication properties of these transmissions, such as signal quality, signal-to-noise ratio, known interferences, channel-quality-indicator values, reference-signal-received-power values, reference-signal-received-quality values, or other characteristics of one or more frequency bands in which the user device can communicate with a cell. In at least some embodiments, this information may be obtained from the user device via one or more measurement reports.

The request for a handover may also include information regarding a current network slice being used by the user device. Network slicing allows operators to apportion the cellular network for specific customer use cases, such as private networks, smart home communications, internet of things communications, smart car communications, smart energy grid communications, high-priority customer communications, business vs. personal communications, etc. The cellular network can optimize computing and network resources for each use case, such as connectivity reliance, data transmission speed, capacity or bandwidth, latency, etc. The user device may be operating within a particular network slice with the current cell that is managing communications with the user device.

In some embodiments, the request may be generated by the user device when communications between the user device and its current cell degrade beyond a selected threshold, such as if the channel-quality-indicator value exceeds the threshold. In other embodiments, the request may be generated by the cell itself, such as if the load on the cell exceeds a select threshold and the cell attempts to offload some of the load to other cells. Moreover, in some embodiments, the user device may provide the information regarding cells it can communicate with and its network slicing utilization with the request. In other embodiments, the user device may periodically transmit this information to the network, such that the network stores this information for use when a handover of the user device from one cell to another cell is identified.

Process 200 proceeds to block 204, where possible cells for the handover are identified. In some embodiments, the possible cells may include one or more cells in which the user device indicated that it is in range of and can communicate with. In other embodiments, the possible cells may include those cells that the user device can communicate with and have sufficient resources or bandwidth to manage communications with the user device.

Process 200 continues at decision block 206, where a determination is made whether the user device is utilizing network slicing. As mentioned above, the user device provides information to the cellular network regarding its network slicing utilization. If the user device is not utilizing network slicing, then process 200 flows to block 212; otherwise, process 200 flows to block 208.

At block 212, a cell is selected for the user device handover. In various embodiments, the cell is selected based on load of the cell, interference, or other networking characteristics, but independent of network slicing capabilities of the cell. After block 212, process 200 continues at block 210.

If, at decision block 206, the user device is utilizing network slicing, then process 200 flows from decision block 206 to block 208. At block 208, a network slicing cell is selected for the user device handover, which is described in more detail below in conjunction with FIG. 3.

Process 200 proceeds next to block 210, where the handover of the user device to the selected cell is initiated. In some embodiments, the selected cell and the user device are notified of the selected cell and that the selected cell is to manage communications with the user device. The current cell communicating with the user device may be instructed to halt the management of communications with the user device. If the selected cell is a network slicing cell, then the selected cell and the user device may be instructed to maintain utilization of the network slicing.

After block 210, process 200 may terminate or otherwise return to a calling process to perform other actions.

Figure 3:
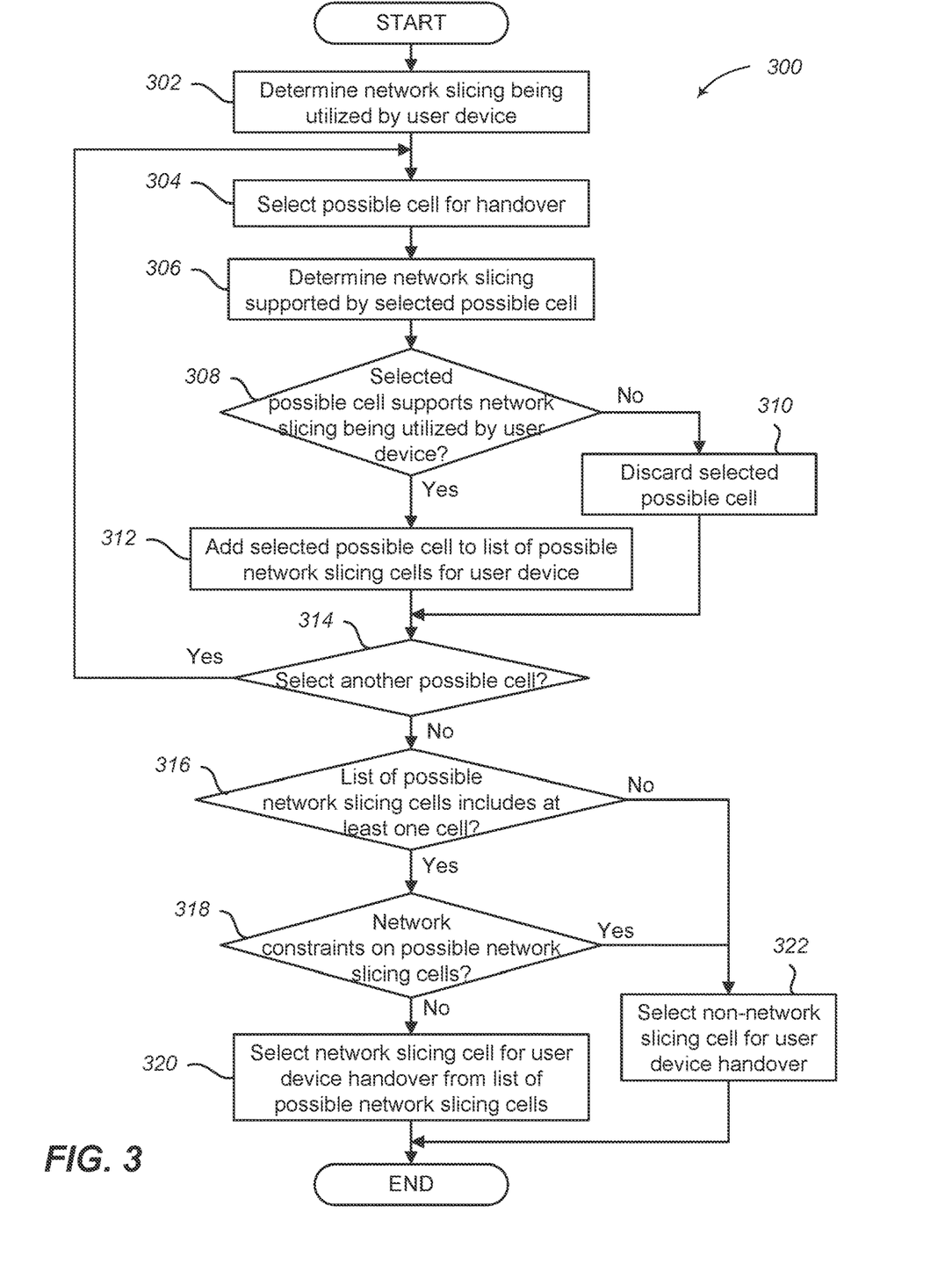
FIG. 3 illustrates a logical flow diagram showing one embodiment of a process for selecting a network slicing cell for handover operations in accordance with embodiments described herein.

FIG. 3 illustrates a logical flow diagram showing one embodiment of a process 300 for selecting a network slicing cell for handover operations in accordance with embodiments described herein.

Process 300 begins, after a start block, at block 302, where the network slicing being utilized by the user device is determined. Because the user device could be using a particular type of network slicing with the current cell that it is communicating with, that type of network slice is determined or otherwise identified.

Process 300 proceeds to block 304, a possible cell is selected for the handover of the user device from a current cell to a second cell. In various embodiments, the possible cell is selected from the one or more possible cells identified at block 204 in FIG. 2. At least one embodiment, each possible cell selected and processed in process 300. The selection of each cell may be based on hardware capabilities of the cells, current network characteristics, whether or not the cells support network slicing, etc.

Process 300 continues to block 306, where the network slicing types supported by the selected possible cell are determined. In some embodiments, the network, such as the cells or the cell handover server, stores a list of the network slicing types supported by the cells in the network.

In some embodiments, one or more of the plurality of cells in the network may support one or more network slicing types or options. In at least one embodiment, one cell may support one network slicing type and another cell may support another, different network slicing type. In yet other embodiments, some cells may support one or more overlapping network slicing types and one or more non-overlapping network slicing types.

The network slicing, or lack of network slicing, supported by a cell may be static or it may be dynamic. For example, a cell may change the network slices it is supporting based on time of day, type or amount of network traffic, type or number of user devices in an area of a cell, or other network or user device characteristics. Because a cell can support one or more network slicing types and those network slicing types may change, the different types of network slicing supported by the selected possible cell are determined or otherwise identified at the time of the handover request received at block 202 in FIG. 2. If the selected possible cell does not support network slicing then that determination is also identified.

Process 300 proceeds to decision block 308, where a determination is made whether the selected possible cell supports the network slicing being utilized by the user device. In various embodiments, the network slicing being utilized by the user device is compared to the network slicing available to or supported by the selected possible cell. If the possible cell supports the same network slicing being utilized by the user device, then process 300 flows to block 312; otherwise, process 300 flows to block 310.

At block 310, the selected possible cell is discarded as a potential cell to handle the handover of the user device. After block 310, process 300 flows to decision block 314.

If, at decision block 308, the selected possible cell supports the same network slicing as being utilized by the user device, process 300 flows from decision block 308 to block 312.

At block 312, the selected possible cell is added to a list of possible network slicing cells for the user device.

Process 300 proceeds next to decision block 314, where a determination is made whether or not to select another possible cell. As mentioned above, each possible cell that the user device is in communication with is selected and processed to determine if it supports network slicing. If another possible cell is to be selected, process 300 loops to block 304; otherwise, process 300 flows to decision block 316.

At decision block 316, a determination is made whether the list of possible network slicing cells includes at least one cell. If the list includes at least one cell, then process 300 flows to decision block 318; otherwise, process 300 flows to block 322.

At decision block 318, a determination is made whether there are one or more network constraints on the possible network slicing cells in the list. In at least one embodiment, this determination is made based on whether the cells in the list have a current load or latency that exceeds a selected threshold. If the cells in the list have too high a load, then those cells may not be acceptable for the handover of the user device, even though they support the network slicing being utilized by the user device.

In other embodiments, this determination may be based on the bandwidth requirements of the user device and the current bandwidth or network constraints of the cell. For example, the network may have one or more rules that a cell cannot accept a user device handover if doing so would cause the cell to exceed a bandwidth utilization threshold for the cell.

Other network constraints may also be considered. For example, a network slicing cell may be too far from the user device to provide quality communications with the user device. In this case, it may be better to select a closer cell that does not support the network slicing of the user device.

If handover of the user device to the cells in the list of possible network slicing cells would violate the network constraints, then process 300 flows to block 322; otherwise, if handover to at least one network slicing cell does not violate the network constrains, then process 300 flows to block 320.

At block 320, a network slicing cell is selected for the user device handover from the list of possible network slicing cells. In various embodiments, this cell is selected from those cells that would not violate the network constraints. Moreover, this cell is selected such that the cell can still manage the user device network slice after the handover is completed. After block 320, process 300 terminates or otherwise returns to a calling process to perform other actions.

If, at decision block 316, there are no cells in the list of possible network slicing cells, or if, at decision block 316, the cells in the list would violate the network constraints, then process 300 flows from decision block 316 or decision block 318, respectively, to block 322.

At block 322, a non-network slicing cells is selected for the user device handover. In some embodiments, the cell may be selected based on the movement of the user device (e.g., the user device is approaching or within communication range of one or more cells), load balancing operations associated with one or more cells (e.g., a cell has more throughput capability compared to the current cell), or other criteria that is assessed to determine if a cell could handle communications for the user device. In various embodiments, block 322 may employ embodiments of block 212 in FIG. 2.

In various embodiments, a user interface may be presented on the user device such that the user can select how the handover cell is to be selected. For example, the user interface may inform the user that the current network slice is no longer available or will not be available after the handover. The user interface can then present a few options for the user to select from, such as a next available cell, lowest load cell, cell in a direction of travel of the user, etc. After block 322, process 300 terminates or otherwise returns to a calling process to perform other actions.

Figure 4:
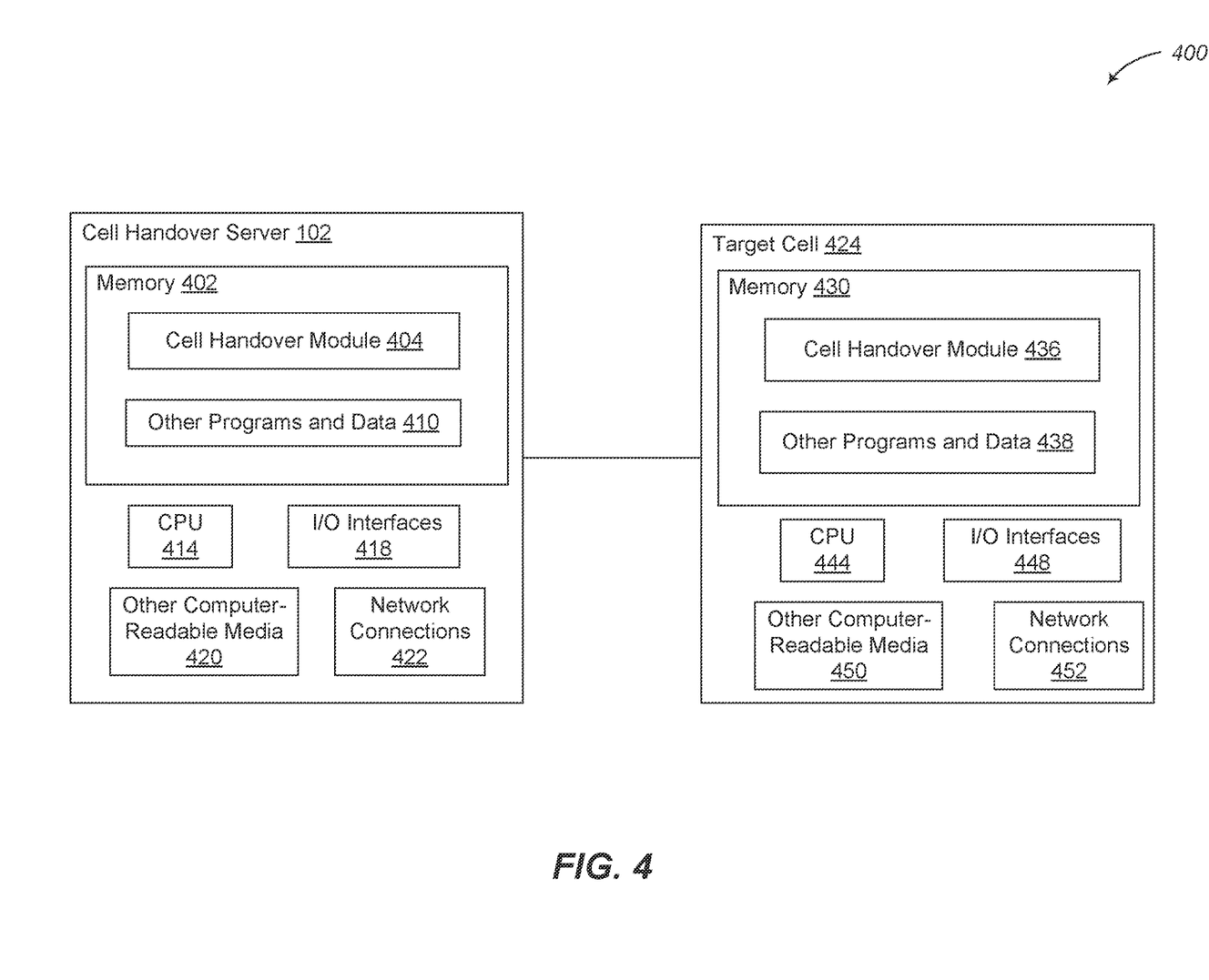
FIG. 4 shows a system diagram that describe various implementations of computing systems for implementing embodiments described herein.

FIG. 4 shows a system diagram that describe various implementations of computing systems for implementing embodiments described herein. System 400 includes a cell handover server 102 and a cell 424. The cell 424 may include one or more cells 112 from FIG. 1.

The cell handover server 102 receives requests for a cell to handover management of communications with a user device to another cell based on network slicing being utilized by the user device and network slicing being supported by the cells, as described herein. One or more special-purpose computing systems may be used to implement cell handover server 102. Accordingly, various embodiments described herein may be implemented in software, hardware, firmware, or in some combination thereof. Cell handover server 102 may include memory 402, one or more central processing units (CPUs) 414, I/O interfaces 418, other computer-readable media 420, and network connections 422.

Memory 402 may include one or more various types of non-volatile and/or volatile storage technologies. Examples of memory 402 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 402 may be utilized to store information, including computer-readable instructions that are utilized by CPU 414 to perform actions, including embodiments described herein.

Memory 402 may have stored thereon cell handover module 404. The cell handover module 404 is configured to perform embodiments described herein to determine which cell is to receive a handover of a user device, which may include employing embodiments of processes 200 and 300 in conjunction with FIGS. 2 and 3. Memory 502 may also store other programs and data 410, which may include cell capabilities, current cell loads, current cell latency, network slicing capabilities of cells, etc.

Network connections 422 are configured to communicate with other computing devices to facilitate the handover of a user device from one cell to another, as described herein. In various embodiments, the network connections 422 include transmitters and receivers (not illustrated) to send and receive data as described herein. I/O interfaces 418 may include a video or audio interfaces, other data input or output interfaces, or the like, which can be used to receive or output information to an administrator, among other actions. Other computer-readable media 420 may include other types of stationary or removable computer-readable media, such as removable flash drives, external hard drives, or the like.

Cell 424 handles cellular network traffic for one or more user devices. If the cell is handling cellular network traffic for a user device, the cell 424 may receive a request to handover the handling of the cellular network traffic for that user device to another cell. In some embodiments, the cell 424 may also generate this request, such as if the communications with the user device become degraded or the user device becomes too far from the cell. In some embodiments, the cell 424 may forward this request to the cell handover server 102. In other embodiments, the cell 424 may perform embodiments described herein to determine a possible cell in which to take over the handling of the cellular network traffic for the user device. One or more special-purpose computing systems may be used to implement target cell 424. Accordingly, various embodiments described herein may be implemented in software, hardware, firmware, or in some combination thereof. Target cell 424 may include memory 430, one or more central processing units (CPUs) 444, I/O interfaces 448, other computer-readable media 450, and network connections 452.

Memory 430 may include one or more various types of non-volatile and/or volatile storage technologies similar to memory 402. Memory 430 may be utilized to store information, including computer-readable instructions that are utilized by CPU 444 to perform actions, including embodiments described herein.

Memory 430 may have stored thereon cell handover module 436. The cell handover module 436 may perform embodiments similar to the cell handover module 404 of the cell handover server 102. Memory 430 may also store other programs and data 438, which may include capabilities of the cell 424, the characteristics or network information for the user devices that it is handling or that it can communicate, network slicing information for user devices in communication with the cell 424, etc.

Network connections 452 are configured to communicate with other computing devices, such as cell handover server 102 or other cells, and user devices (not illustrated). In various embodiments, the network connections 452 include transmitters and receivers (not illustrated) to send and receive data as described herein. I/O interfaces 448 may include one or more other data input or output interfaces. Other computer-readable media 450 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device, comprising:
   a memory configured to store computer instructions; and
   a processor configured to execute the computer instructions to:
   receive a request to handover management of a user device from a first cell to a second cell;
   identify a plurality of possible cells for the handover;
   determine if the user device is utilizing network slicing with the first cell; and
   in response to determining that the user device is utilizing network slicing:
      identify one or more potential cells from the plurality of possible cells that support the network slicing being utilized by the user device;
      determine network constraints on each potential cell of the one or more potential cells; and
      select the second cell from the one or more potential cells based on the second cell utilizing the network slicing and complying with the network constraint of the second cell, including:
         determine that the user device is utilizing a particular slice of a plurality of slices;
         determine that a third cell violates the network constraint by having a first latency above a threshold for the particular slice; and
         in response to determining that a third cell violates the network constraint for the particular slice:
            determine that the second cell complies with the network constraint by having a second latency below the threshold amount for the particular slice; and
            select the second cell from the one or more potential cells in response to the second cell complying with the network constraint; and
      initiate handover of the user device from the first cell to the second cell.

2. The computing device of claim 1, wherein the processor determines the network constraints on each potential cell and selects the second cell by being configured to further execute the computer instructions:
   determine a network traffic load on each potential cell of the one or more potential cells;

determine if the network traffic load of each corresponding potential cell complies with or violates the network constraint of the corresponding potential cell; and select the second cell from the one or more potential cells in response to the network traffic load of the second cell complying with the network constraint of the second cell relative to the network traffic load of other cells of the one or more potential cells violating the network constraints of the other cells.

3. The computing device of claim 1, wherein the processor selects the second cell by being configured to further execute the computer instructions:

determine a network quality of service of each of potential cell of the one or more potential cells;

determine if the network quality of service of each corresponding potential cell complies with or violates the network constraint of the corresponding potential cell; and select the second cell from the one or more potential cells in response to the network quality of service of the second cell complying with the network constraint of the second cell relative to the network quality of service of other cells of the one or more potential cells violating the network constraints of the other cells.

4. The computing device of claim 1, wherein the processor selects the second cell by being configured to further execute the computer instructions:

determine that the user device is utilizing a particular slice of a plurality of slices;

determine that a third cell violates the network constraint of the third cell by having a first current bandwidth above a threshold amount for the particular slice; and in response to determining that a third cell violates the network constraint for the particular slice:

determine that the second cell complies with the network constraint of the second cell by having a second current bandwidth below the threshold amount for the particular slice; and select the second cell from the one or more potential cells in response to the second cell complying with the network constraint of the second cell.

5. A method, comprising:

receiving a request to handover management of a user device from a first cell to a second cell;

identifying a plurality of possible cells for the handover;

determining if the user device is utilizing network slicing with the first cell;

in response to determining that the user device is utilizing network slicing:

identifying one or more potential cells from the plurality of possible cells that support the network slicing being utilized by the user device;

determining network constraints on each potential cell of the one or more potential cells; and selecting the second cell from the one or more potential cells based on the second cell utilizing the network slicing and complying with the network constraint of the second cell, including:

determining that the user device is utilizing a particular slice of a plurality of slices;

determining that a third cell violates the network constraint by having a first latency above a threshold for the particular slice; and in response to determining that a third cell violates the network constraint for the particular slice:

determining that the second cell complies with the network constraint by having a second latency below the threshold amount for the particular slice; and selecting the second cell from the one or more potential cells in response to the second cell complying with the network constraint; and initiating handover of the user device from the first cell to the second cell.

6. The method of claim 5, wherein selecting the second cell comprises:

determining a network traffic load on each potential cell of the one or more potential cells;

determining if the network traffic load of each corresponding potential cell complies with or violates the network constraint of the corresponding potential cell; and selecting the second cell from the one or more potential cells in response to the network traffic load of the second cell complying with the network constraint of the second cell relative to the network traffic load of other cells of the one or more potential cells violating the network constraints of the other cells.

7. The method of claim 5, wherein selecting the second cell comprises:

determining a network quality of service of each of potential cell of the one or more potential cells;

determining if the network quality of service of each corresponding potential cell complies with or violates the network constraint of the corresponding potential cell; and selecting the second cell from the one or more potential cells in response to the network quality of service of the second cell complying with the network constraint of the second cell relative to the network quality of service of other cells of the one or more potential cells violating the network constraints of the other cells.

8. The method of claim 5, wherein initiating handover comprises:

determining that the user device is utilizing a particular slice of a plurality of slices; and determining that a third cell violates the network constraint of the third cell by having a first current bandwidth above a threshold amount for the particular slice; and in response to determining that a third cell violates the network constraint for the particular slice:

determining that the second cell complies with the network constraint of the second cell by having a second current bandwidth below the threshold amount for the particular slice; and selecting the second cell from the one or more potential cells in response to the second cell complying with the network constraint of the second cell.

9. A non-transitory computer-readable medium storing computer instructions that, when executed by at least one processor, cause the at least one processor to perform actions, the actions comprising:

receiving a request to handover management of a user device from a first cell to a second cell;

identifying a plurality of possible cells for the handover;

determining if the user device is utilizing network slicing with the first cell;

in response to determining that the user device is utilizing network slicing:

identifying one or more potential cells from the plurality of possible cells that support the network slicing being utilized by the user device;
determining network constraints on each potential cell of the one or more potential cells; and
selecting the second cell from the one or more potential cells based on the second cell utilizing the network slicing and complying with the network constraint of the second cell, including:
  determining that the user device is utilizing a particular slice of a plurality of slices;
  determining that a third cell violates the network constraint by having a first latency above a threshold for the particular slice; and
  in response to determining that a third cell violates the network constraint for the particular slice:
    determining that the second cell complies with the network constraint by having a second latency below the threshold amount for the particular slice; and
    selecting the second cell from the one or more potential cells in response to the second cell complying with the network constrain; and
initiating handover of the user device from the first cell to the second cell.

10. The non-transitory computer-readable medium of claim 9, wherein the computer instructions that, when executed by at least one processor to select the second cell, cause the at least one processor to perform further actions, the further actions comprising:
determining a network traffic load on each potential cell of the one or more potential cells;
determining if the network traffic load of each corresponding potential cell complies with or violates the network constraint of the corresponding potential cell; and
selecting the second cell from the one or more potential cells in response to the network traffic load of the second cell complying with the network constraint of the second cell relative to the network traffic load of other cells of the one or more potential cells violating the network constraints of the other cells.

11. The non-transitory computer-readable medium of claim 9, wherein the computer instructions that, when executed by at least one processor to select the second cell, cause the at least one processor to perform further actions, the further actions comprising:
determining a network quality of service of each of potential cell of the one or more potential cells;
determining if the network quality of service of each corresponding potential cell complies with or violates the network constraint of the corresponding potential cell; and
selecting the second cell from the one or more potential cells in response to the network quality of service of the second cell complying with the network constraint of the second cell relative to the network quality of service of other cells of the one or more potential cells violating the network constraints of the other cells.

12. The non-transitory computer-readable medium of claim 9, wherein the computer instructions that, when executed by at least one processor to select the second cell, cause the at least one processor to perform further actions, the further actions comprising:
determining that the user device is utilizing a particular slice of a plurality of slices;
determining that a third cell violates the network constraint of the third cell by having a first current bandwidth above a threshold amount for the particular slice; and
in response to determining that a third cell violates the network constraint for the particular slice:
  determining that the second cell complies with the network constraint of the second cell by having a second current bandwidth below the threshold amount for the particular slice; and
  selecting the second cell from the one or more potential cells in response to the second cell complying with the network constraint of the second cell.

\* \* \* \* \*